United States Patent  
Neudecker et al.

(10) Patent No.: US 7,422,540 B2
(45) Date of Patent: Sep. 9, 2008

(54) FIXING THE POSITION OF A PLANET GEAR PIN

(75) Inventors: Andreas Neudecker, Weisendorf (DE); Norbert Metten, Aurachtal (DE); Gustav Weidmann, Erlangen (DE)

(73) Assignee: Schaeffler KG, Herzogenaurach (DE)

( * ) Notice: Subject to any disclaimer, the term of this patent is extended or adjusted under 35 U.S.C. 154(b) by 241 days.

(21) Appl. No.: 10/547,831

(22) PCT Filed: Feb. 20, 2004

(86) PCT No.: PCT/EP2004/001651

§ 371 (c)(1),
(2), (4) Date: Feb. 9, 2006

(87) PCT Pub. No.: WO2004/079230

PCT Pub. Date: Sep. 16, 2004

(65) Prior Publication Data

US 2006/0148611 A1   Jul. 6, 2006

(30) Foreign Application Priority Data

Mar. 6, 2003   (DE) ............................... 103 09 666

(51) Int. Cl.
*F16H 57/08* (2006.01)

(52) U.S. Cl. ....................................... 475/331
(58) Field of Classification Search ................ 475/331, 475/346, 347, 159; 403/329, 397
See application file for complete search history.

(56) References Cited

U.S. PATENT DOCUMENTS

| 5,240,462 | A | * | 8/1993 | Mochizuki et al. | .......... 475/342 |
| 5,910,062 | A | | 6/1999 | Mizuta | |
| 6,322,282 | B1 | * | 11/2001 | Kussman et al. | ............ 403/329 |

FOREIGN PATENT DOCUMENTS

| DE | 74 18 166 | 9/1974 |
| DE | 25 03 518 | 11/1976 |
| DE | 28 50 099 | 5/1979 |
| DE | 42 24 331 | 1/1994 |
| DE | 196 11 605 | 9/1997 |
| EP | 02 74 874 | 7/1988 |
| EP | 0 476 395 | 11/1995 |
| EP | 1 028 275 | 8/2000 |
| JP | 63 231 036 | 9/1988 |

* cited by examiner

*Primary Examiner*—Sherry Estremsky
*Assistant Examiner*—Edwin A Young
(74) *Attorney, Agent, or Firm*—Volpe and Koenig, P.C.

(57) ABSTRACT

A planet gear pin (4) is secured against axial displacement relative to a planet gear carrier (1) using an elastically deflectable or deformable retaining element (9, 9a, 9b) arranged in a location hole (10) in the planet gear pin (4).

14 Claims, 6 Drawing Sheets

FIXING THE POSITION OF A PLANET GEAR PIN

FIELD OF THE INVENTION

The invention relates to a planetary gear with a planet carrier and planet gears, which mesh by means of teeth with a ring gear on one side and with a sun gear on the other side, wherein the planet gears can rotate on planet gear pins by means of roller bearings and the planet gear pins are held in location holes of the planet gear carrier.

BACKGROUND

Such planetary gears are sufficiently well known to someone skilled in the art. In the interior of a planet gear set, the so-called sun gear turns on a central shaft. Several gears having teeth that engage in the peripheral teeth of this sun gear are provided, in practice usually three to five, which are designated as planet gears due to their obvious arrangement. And as planets, as they rotate they also move in a circular motion about the sun gear, while they simultaneously turn about their own axis. The shafts of the planet gears are fixed on the planet gear carrier, which receives this rotational movement, that is, likewise in the rotational direction about the central axis. As a third element, the ring gear surrounds the entire formation, in that it engages the planet gears with its internal teeth from the outside. Here, the central axis also represents the center of rotation.

The shafts of the planet gears are also designated as planet gear pins and are fixed in the planet gear carrier in various ways.

According to DE 196 11 605 A1, this is realized in that both the planet gear carrier and also the planet gear pins are provided with radially extending holes, in which attachment screws are inserted. After being screwed in, the screw bodies of these attachment screws are both in the planet gear pin and also in the planet gear carrier, so that the planet gear pins are secured against axial displacement. It is obvious that such a position-fixing device of the planet gear pin is very complicated. First, both in the planet gear carrier and also in the planet gear pin, the location holes are to be formed and provided with a corresponding internal thread. Then, both are set relative to each other in the peripheral direction so that the holes align, before finally, the attachment screws can be inserted.

Another such type of attachment follows from the German Utility Model Application DE 74 181 66 U. This is realized in that first a hoop ring is pushed onto the planet gear pin. The ring is connected to the pin by means of a weld. Then, the planet gear pin is secured by means of a retainer ring, which engages in an annular groove of the collar ring and secures this against axial displacement. Here, it can also be recognized that such an attachment of the planet gear pin in the planet gear carrier is very complicated and costly.

Finally, in DE-OS 25 03 518, another type of attachment of the planet gear pin in a planet gear carrier is described. FIG. 2 of this prior publication shows a planet gear carrier comprising two disc-shaped sheet-metal parts welded to each other with a planet gear. The planet gear pin is held in two aligned holes of the two sheet-metal parts of the planet gear carrier. The pin is fixed in that it is stamped at its two end sides. Now, in this respect, it is known to someone skilled in the art that the planet gear pin is subjected to very high loads and therefore must be subjected to a hardening process before being installed in the planet gear. Now, in order to carry out stamping of the pins in general at the two opposing end surfaces, they must be subjected to a soft-annealing process. It is obvious that such a process is also very complicated and thus expensive.

SUMMARY

Therefore, starting with the disadvantages of the prior state of the art, the invention is based on the objective of reducing expense in the manufacturing or assembly process of a planetary gear through a simpler type of attachment of the planet gear pin in the planet gear carrier.

According to the invention, an axial displacement of the planet gear pin in the planet gear carrier is prevented by an elastically deflectable or deformable retaining element, which, on one hand, engages in a location hole in the planet gear pin and, on the other hand, covers the planet gear pin and planet gear carrier in the radial direction.

It is obvious that such a type of attachment is considerably simplified relative to the prior state of the art, because only one retaining element connecting the planet gear carrier and planet gear pin has to be pushed into the location hole of the planet gear pin. After its elastic expansion or deformation, a secure hold of the two parts to each other is guaranteed.

Other advantageous configurations of the invention are described below.

The retaining element has a circular ring-type region extending in the radial direction. Bars extend from this region in the axial direction in the shape of a pipe and are separated from each other in the peripheral direction by axis parallel slots and have locking cams projecting radially outwards at their free ends.

In an advantageous improvement of the invention, the circular region of the retaining element should be provided in its center with a passage. This is required if the roller body of the planet gear is to be supplied with lubricant via the retaining element and the planet gear pin.

This retaining element is produced from spring steel or from plastic.

A notch is machined into the location hole of the planet gear pin. An annular retaining surface for the locking cams of the retaining element is formed by this notch. In this way, a secure locking connection is formed between the retaining element and the planet gear pin.

Another improvement of the solution according to the invention is several retaining elements are connected to each other in the peripheral direction by a radially extending circular ring, from which they extend in the axial direction, so that a compound retaining element is formed. This is especially advantageous, because, for example, in a planetary gear with five planet gears, five retaining elements do not have to be handled individually, instead only one.

In another improvement of the invention, several retaining elements are connected to each other in the peripheral direction by a hollow body that is open towards one side, so that a compound retaining element is formed.

The hollow body comprises two radially extending circular rings, which are spaced apart from each other in the axial direction and which are connected at their outer extent by an axially extending back part, wherein there is a passage that extends to the space between the two circular rings in the circular ring which is connected to the retaining elements.

The advantage of this arrangement lies not only in a simple connection of several retaining elements, but it also lies in the fact that this retaining element combined according to the invention can be used simultaneously for improved directed oil guidance in planetary gears. Thus, retention and directed oil guidance functions are combined into one. According to the prior state of the art, the oil guidance function was realized through complicated additional retaining sheets.

The invention is described in more detail using the following embodiments.

BRIEF DESCRIPTION OF THE DRAWING(S)

Shown are:

DETAILED DESCRIPTION OF THE PREFERRED EMBODIMENT(S)

Figure 1:
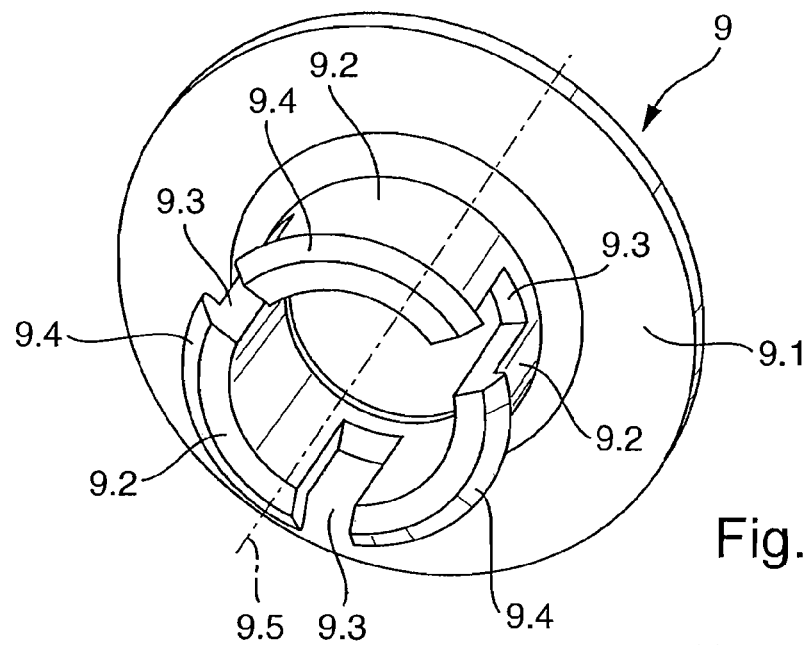
FIG. 1 is a partial longitudinal section through a planetary gear.
Figure 2:
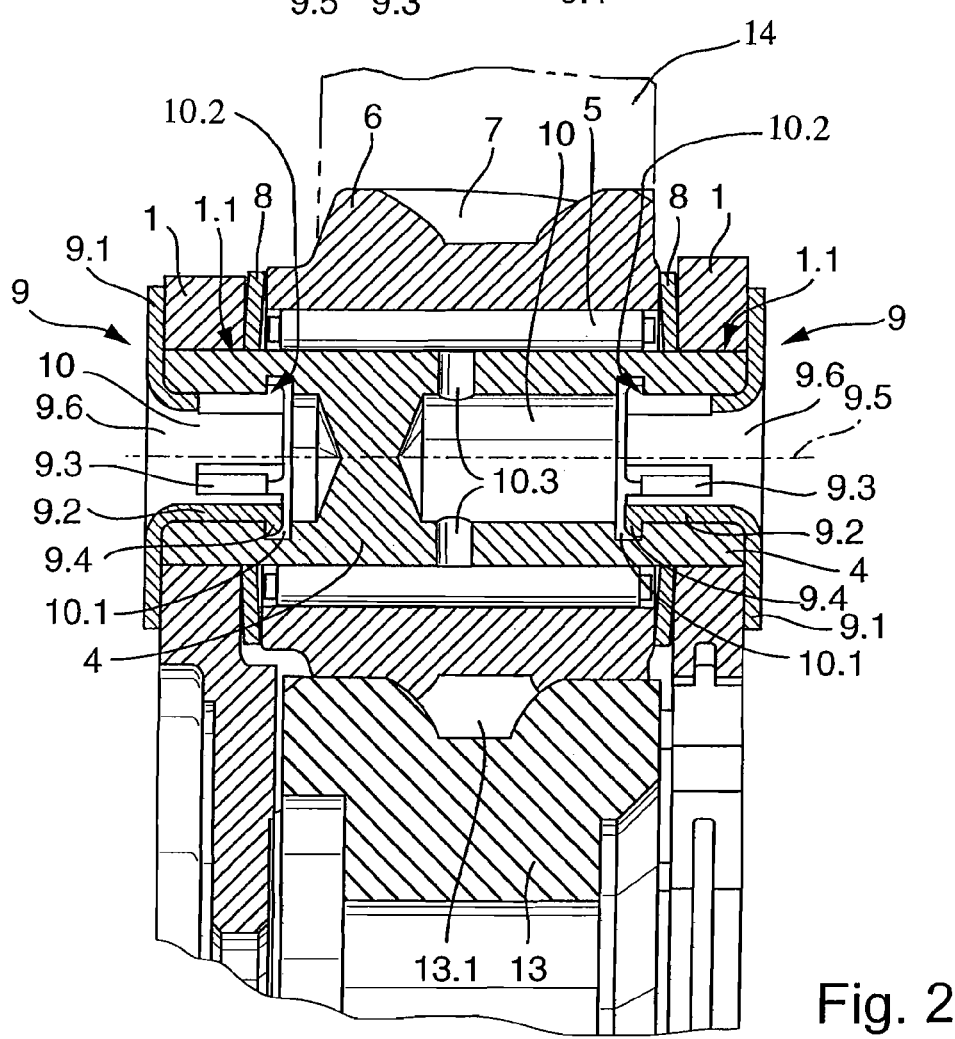
FIG. 2 is a enlarged perspective view of a retaining element according to the invention as a single part.
Figure 8:
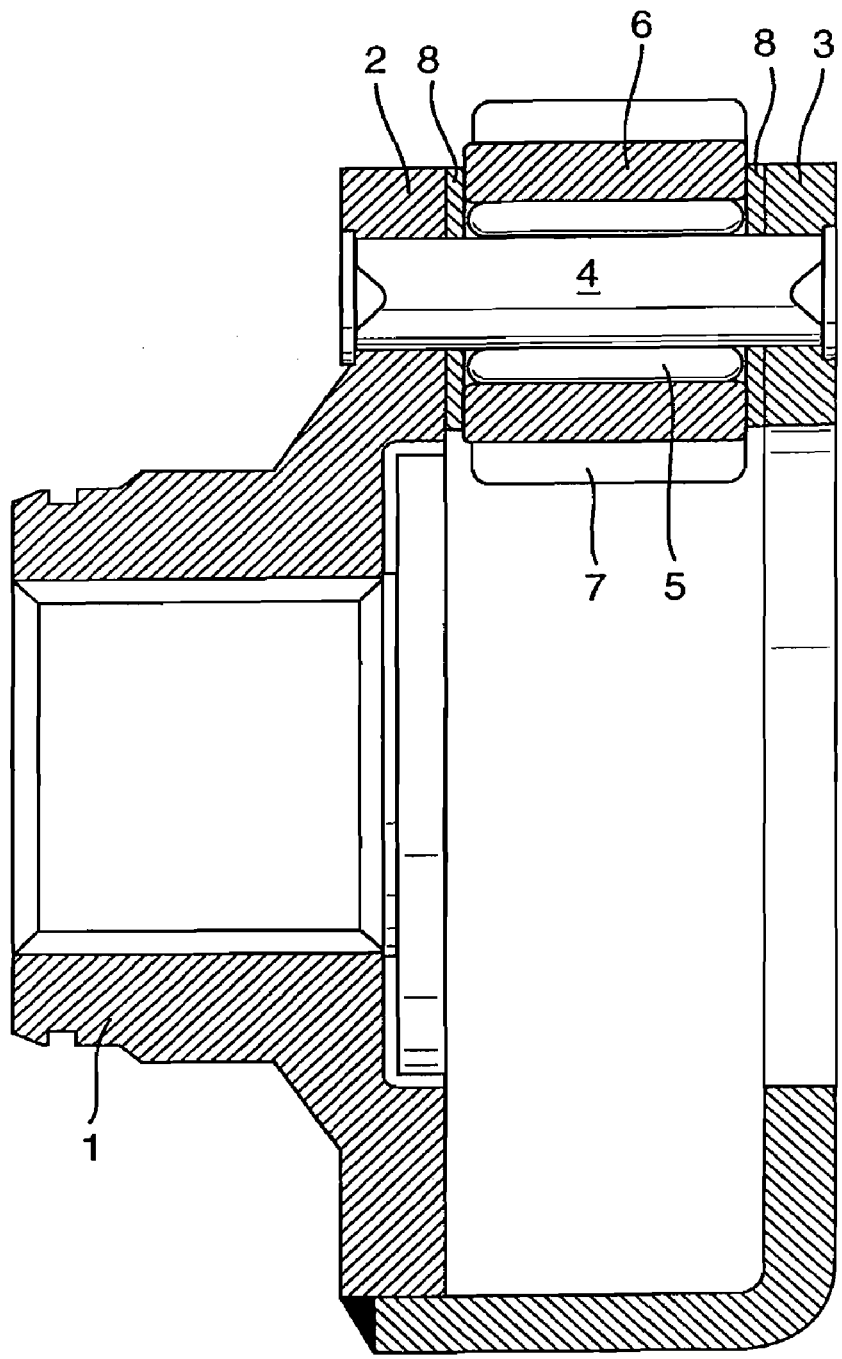
FIG. 8 is a longitudinal section through a planet gear carrier according to the prior state of the art.

The planet gear carrier 1 shown in FIG. 8 according to the state of the art has two side walls 2, 3, in whose location holes planet gear pins 4 are fixed. On these pins, planet gears 6 can rotate by means of bearing arrangements 5. The teeth 7 of these gears mesh with a not-shown hollow gear on one side and with a similarly not-shown sun gear on the other side. FIG. 2 shows how the planet gears of the present invention have teeth that mesh with a ring gear 14 on one side and a sun gear on the other side. FIG. 8 also shows stopping plates 8, which typically comprise a material with good sliding properties, such as, e.g., sheet metal plated with bronze, which thus reduce the friction between the planet gears 6 and the planet gear carrier 1, are arranged on the planet gear pin 4 on both sides of the planet gears 6. As FIG. 8 further shows, the planet gear pins 4 are fixed in the location holes of the side walls 2, 3 of the planet gear carrier 1 by stamping. That is, the retention of the planet gear pin is realized by material displacement on the two opposing end sides of the planet gear pin 4. However, as already explained explicitly in the introduction under the state of the art, such an attachment of the planet gear pin 4 in the planet gear carrier 1 is very complicated.

In FIG. 2, a retaining element 9 according to the invention is shown, which includes a circular base region 9.1. Bars 9.2, which are separated from each other in the peripheral direction by axis parallel slots 9.3, are arranged in the shape of a pipe, and extend from this base region in the direction of the longitudinal axis 9.5. It is clear that in this way, a radially inward or outward deflection of the bars 9.2 is possible. On their free ends, the bars 9.2 have locking cams 9.4 spaced apart from each other in the peripheral direction.

The planet gear shown in FIG. 2 comprises the planet gear 6, which is arranged on the planet gear pin 4 and whose teeth 7 mesh with teeth 13.1 of the sun gear 13. The planet gear 6 is supported by the bearing 5, wherein stopping plates 8 are arranged on both sides between the planet gear 6 and the planet gear carrier 1. As FIG. 2 shows further, the planet gear pin 4 is held in the location holes 1.1 of the planet carrier 1. The planet gear pin 4 is equipped on both sides with an axially extending location hole 10, which has a notch 10.1, so that a retaining surface 10.2 is formed. As can be further seen from FIG. 2, the retaining element 9 covers with its circular region 9.1 in the radial direction both the end side of the planet gear pin 4 and also a part of an end side of the planet gear carrier 1. When the retaining element 9 is pushed in, its bars 9.2 are guided inwards due to their elasticity in the radial direction and spring radially outwards after reaching the notch 10.1, so that the locking cams 9.4 of the retaining element 9 contact the retaining surface 10.2 of the notch 10.1. The location hole 10 arranged on the right side in the planet gear pin 4 is extended in the direction of the pin middle and provided with radial holes 10.3, which open into the raceway region of the bearing 5. In the present embodiment, both the retaining elements 9 arranged on the left side and also on the right side are provided with a passage 9.6, so that the bearing 5 can be provided with lubricant from the outside via the passage 9.6, the location hole 10, and the radial holes 10.3 branching away from the location hole.

Figure 3:
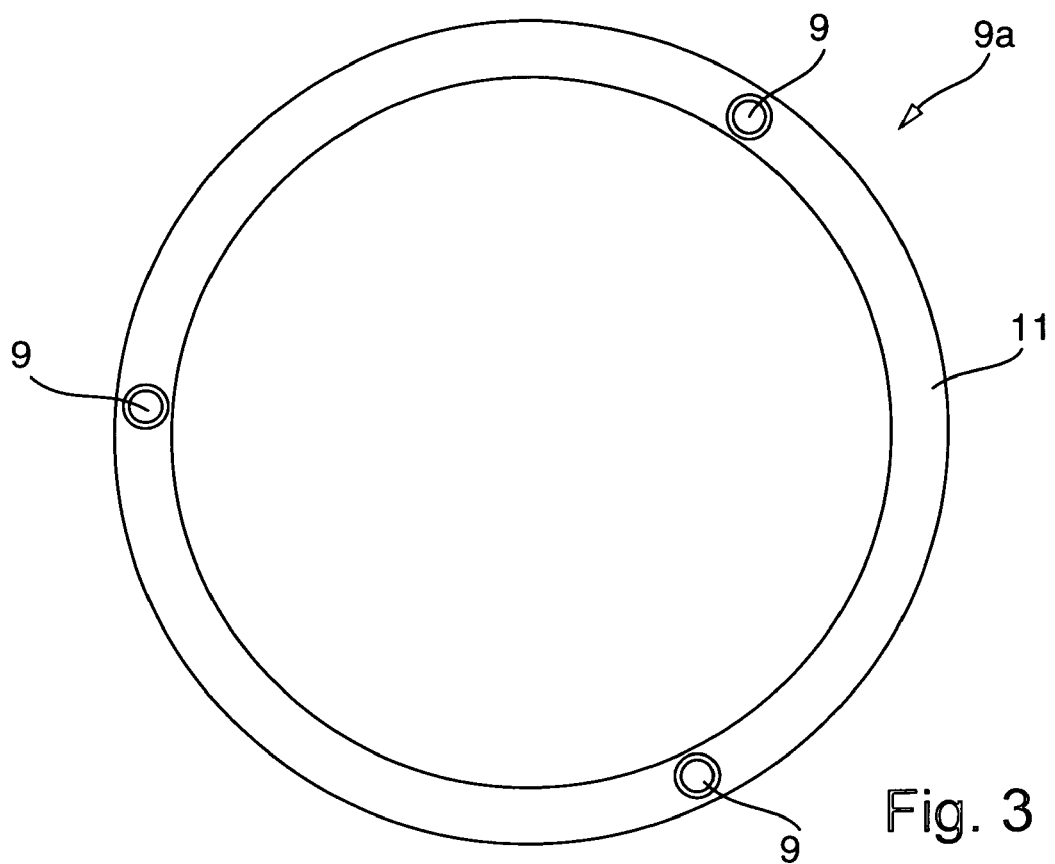
FIGS. 3 and 4 are a side view of a compound retaining element without an oil guidance function.
Figure 4:
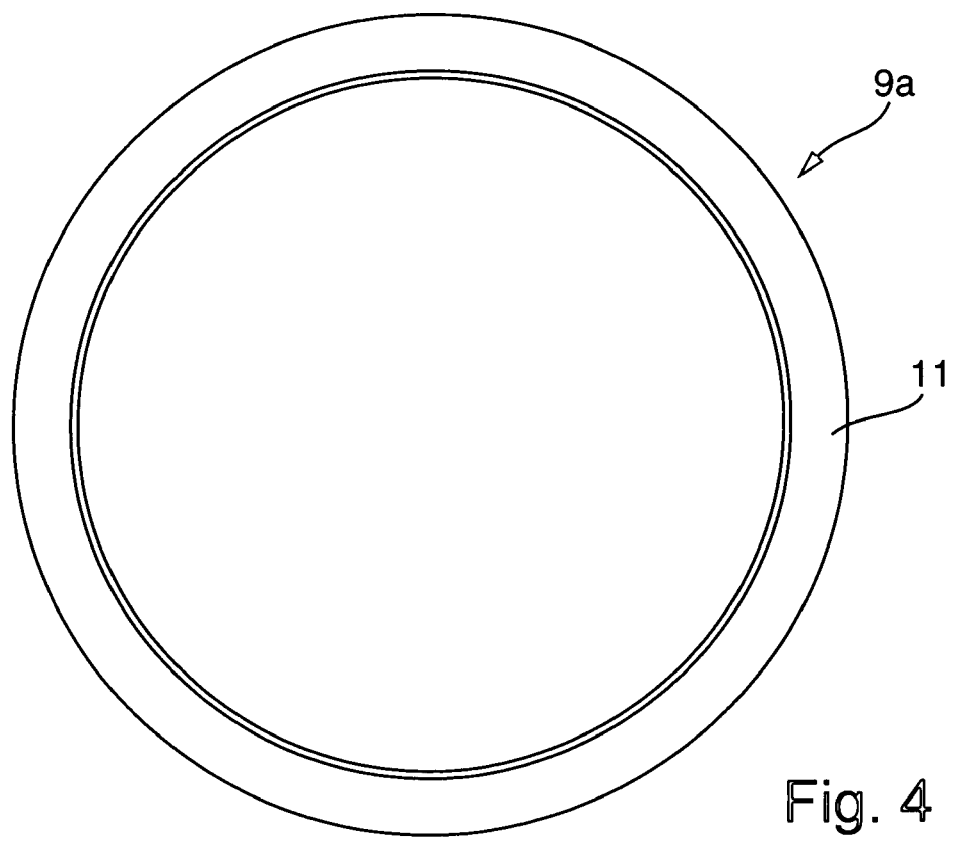

If a planetary gear is equipped, for example, with three planet gears 6, then it has proven to be advantageous to connect three individual retaining elements 9 to the circular ring 11, such that these elements are arranged at three peripheral positions spaced apart from each other uniformly and so that they extend from this ring in the axial direction. In this way, a compound retaining element 9a is formed, which simplifies the assembly of the planetary gear with the provided three planet gears. Such a retaining element 9a is shown in FIGS. 3 and 4.

Figure 5:
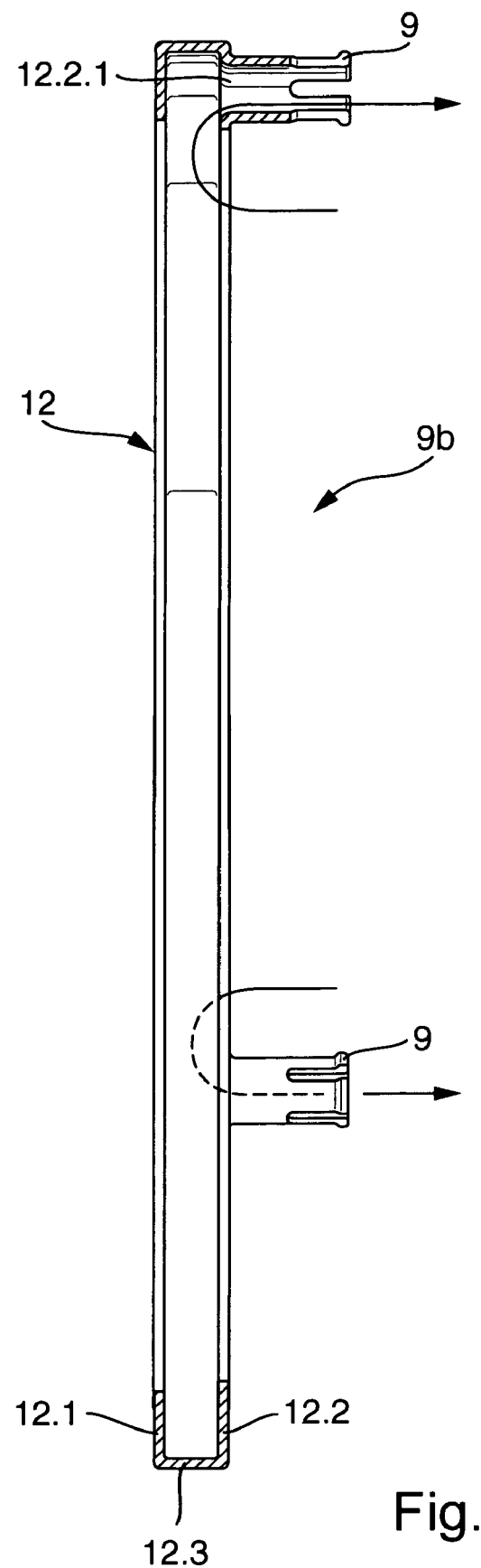
FIGS. 5 and 6 are a section and a perspective view, respectively, of a compound retaining element with an oil guidance function.
Figure 6:
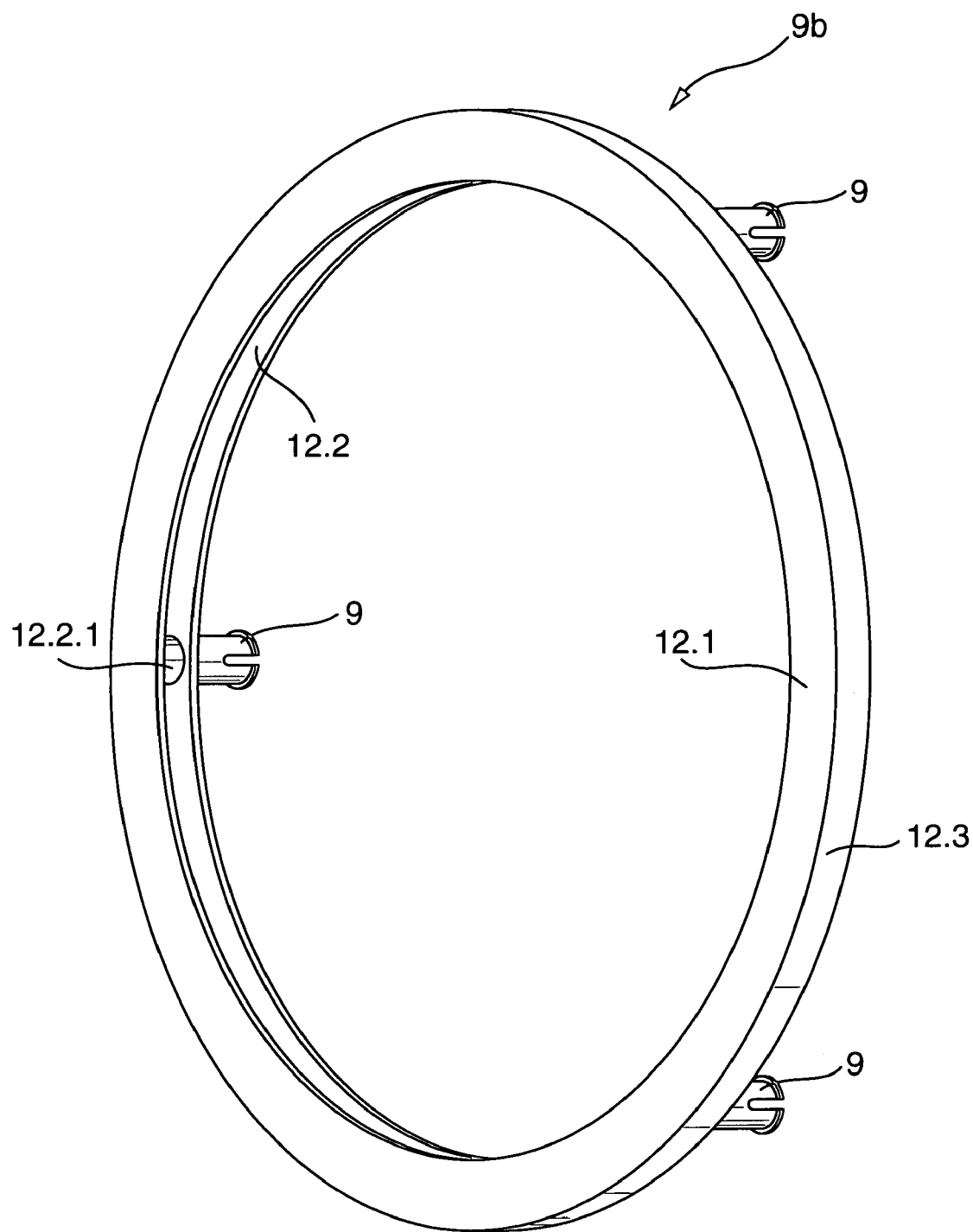

In FIGS. 5 and 6, a compound retaining element 9b with oil guidance function is shown. As can be seen from this, three individual retaining elements 9 that are spaced apart from each other uniformly in the peripheral direction are connected to the hollow body 12, which is combined from two circular rings 12.1, 12.2 that are spaced apart from each other in the axial direction and are connected to each other at their outer side by the back part 12.3, so that the formed hollow body 12 is open towards its inner side. As can be seen in the top part of FIG. 5, in the connecting region of the retaining element 9 and circular ring 12.2, this is provided with a passage 12.2.1, so that this compound retaining element 9b can perform an oil guidance function, as shown by the arrows.

Figure 7:
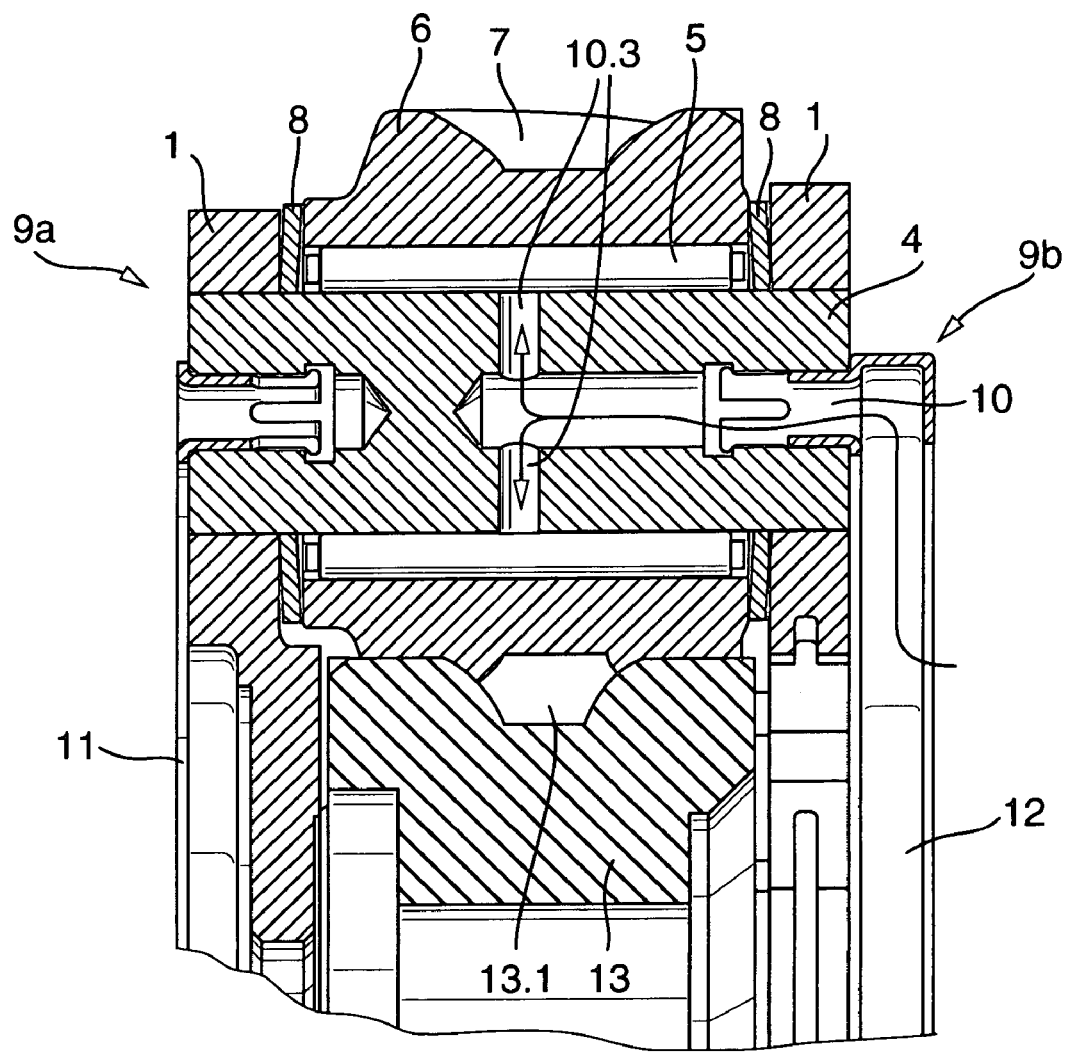
FIG. 7 is a partial longitudinal section through a planet gear.

Finally, in FIG. 7 a planetary gear is shown, whose planet gear pins 4 are secured in the planet gear carrier 1 in the same way, but in a different construction. While this is achieved on the left side with the compound retaining element 9a, it is realized on the right side with the compound retaining element 9b. In the ready described way, the left-side retaining element 9a is combined from several individual retaining elements 9, which are connected to each other by the circular ring 11. In contrast, the right-side retaining element 9 is equipped with a directed oil guidance function, which is realized by a combination of individual retaining elements 9 with the hollow body 12 open towards the inside. Thus for the retaining element 9b, the retaining and lubricant guidance functions are combined into one. The path of the lubricant through the planetary gear is realized from the outside towards the inside first via the hollow body 12, then via the passage 12.2.1 into the axially extending location hole 10. From this hole, it is led via the branching radial holes 10.3 into the raceway region of the bearing arrangement 5.

REFERENCE SYMBOLS

Planet Gear Carrier
1.1 Location hole
2 Side wall
3 Side wall
4 Planet gear pin
5 Bearing 6 Planet gear
7 Teeth
8 Stopping plate
9 Retaining element
9a Retaining element
9b Retaining element
9.1 Circular region
9.2 Bar
9.3 Slot
9.4 Locking cam
9.5 Longitudinal axis
9.6 Passage
10 Location hole
10.1 Notch
10.2 Retaining surface
10.3 Radial hole
11 Circular ring
12 Hollow body
12.1 Circular ring
12.2 Circular ring
12.2.1 Passage
12.3 Back part
13 Sun gear
13.1 Teeth
14 Ring gear

The invention claimed is:

1. Planetary gear comprising a planet gear carrier and planet gears having teeth that mesh with a ring gear on one side and with a sun gear on the other side, wherein the planet gears rotate via roller bearings on planet gear pins and the planet gear pins are held in location holes of the planet gear carrier, wherein axial displacement of the planet gear pins in the planet gear carrier is prevented by an elastically deflectable or deformable retaining element, which engages in a respective location hole in the planet gear pin and covers the planet gear pin and planet gear carrier in a radial direction, wherein several of the retaining elements are connected to each other in a peripheral direction by a hollow body that is open towards one side, so that a compound retaining element is formed.

2. Planetary gear according to claim 1, wherein each of the retaining elements has a radially extending circular region, from which, bars extend in an axial direction that are arranged in a pipe shape and are separated from each other in a peripheral direction by axis parallel slots and have locking cams projecting radially outwards at free ends thereof.

3. Planetary gear according to claim 2, wherein the circular region is provided with a passage in a center thereof.

4. Planetary gear according to claim 2, wherein a notch, which forms an annular retaining surface for the locking cams of the retaining element, is provided in the location hole of the planet gear pin.

5. Planetary gear according to claim 1, wherein the retaining element is manufactured from spring steel or from plastic.

6. Planetary gear according to claim 1, wherein several retaining elements are connected to each other in a peripheral direction by a radially extending circular ring, from which the retaining elements extend in the axial direction, so that a compound retaining element is formed.

7. Planetary gear according to claim 1, wherein the hollow body comprises two radially extending circular rings, which are spaced apart from each other in the axial direction and which are connected to each other at their outer extent by an axially extending back part, a passage is defined in the back part to the space between both circular rings in the circular ring connected to the retaining elements.

8. Planetary gear comprising:
a planet gear carrier and planet gears having teeth that mesh with a ring gear on one side and with a sun gear on the other side,
wherein the planet gears rotate via roller bearings on planet gear pins, and the planet gear pins are held in location holes of the planet gear carrier
elastically deflectable or deformable retaining elements engage in respective location holes in the planet gear pins and cover the planet gear pin and planet gear carrier in a radial direction to prevent axial displacement of the planet gear pins in the planet gear carrier,
each of the retaining elements has a radially extending circular region from which a hollow bar axially extends perpendicular to the circular region, said hollow bar having at least one slot therein, and at least one locking cam projects radially outwardly at a free end of said hollow bar.

9. Planetary gear according to claim 8, wherein the circular region is provided with a passage in a center thereof.

10. Planetary gear according to claim 8, wherein the retaining element is manufactured from spring steel or plastic.

11. Planetary gear according to claim 8, wherein a notch, which forms an annular retaining surface for the locking cams of the retaining element, is provided in the location hole of the planet gear pin.

12. Planetary gear according to claim 8, wherein several of the retaining elements are connected to each other in a peripheral direction by a radially extending circular ring, from which the retaining elements extend in the axial direction, so that a compound retaining element is formed.

13. Planetary gear according to claim 8, wherein several retaining elements are connected to each other in a peripheral direction by a hollow body that is open towards one side, so that a compound retaining element is formed.

14. Planetary gear according to claim 8, wherein the hollow body comprises two radially extending circular rings, which are spaced apart from each other in the axial direction and which are connected to each other at outer portions thereof by an axially extending back part, and a passage is defined in the back part to the space between both circular rings in the circular ring connected to the retaining elements.

* * * * *